Oct. 10, 1939.  P. S. WILNAU  2,175,498
REFRIGERATOR
Filed May 27, 1937   2 Sheets-Sheet 2
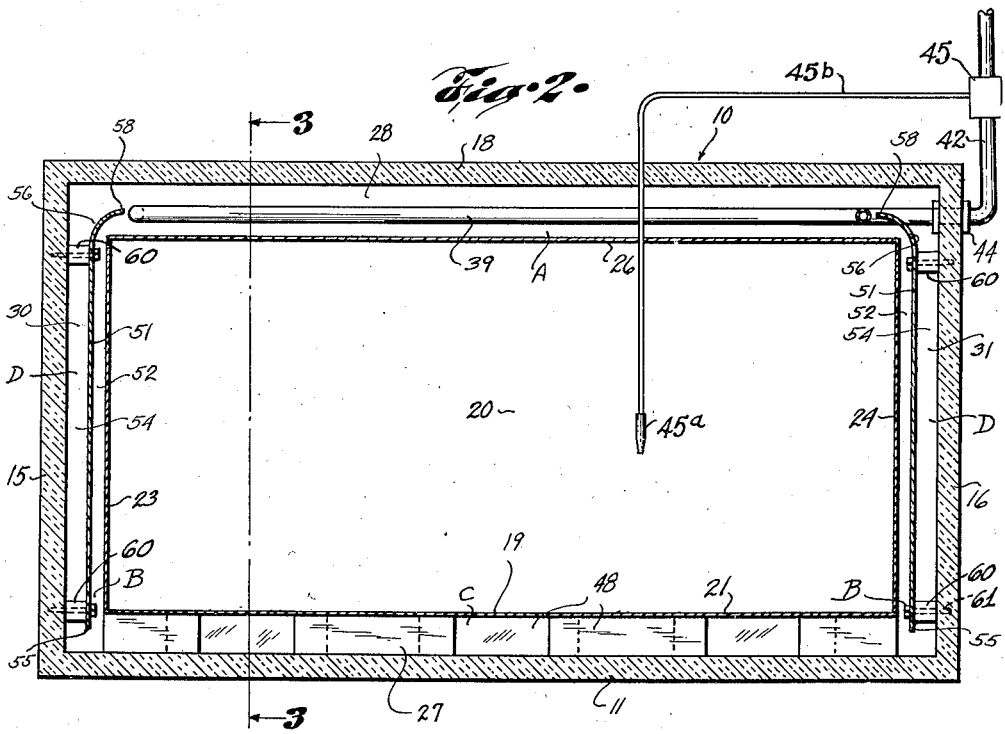
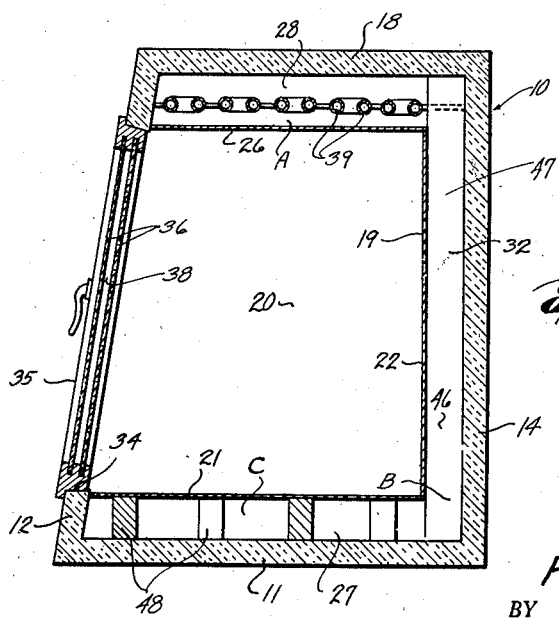
INVENTOR.
PHILIP S. WILNAU
BY George A. Woodruff
ATTORNEY.

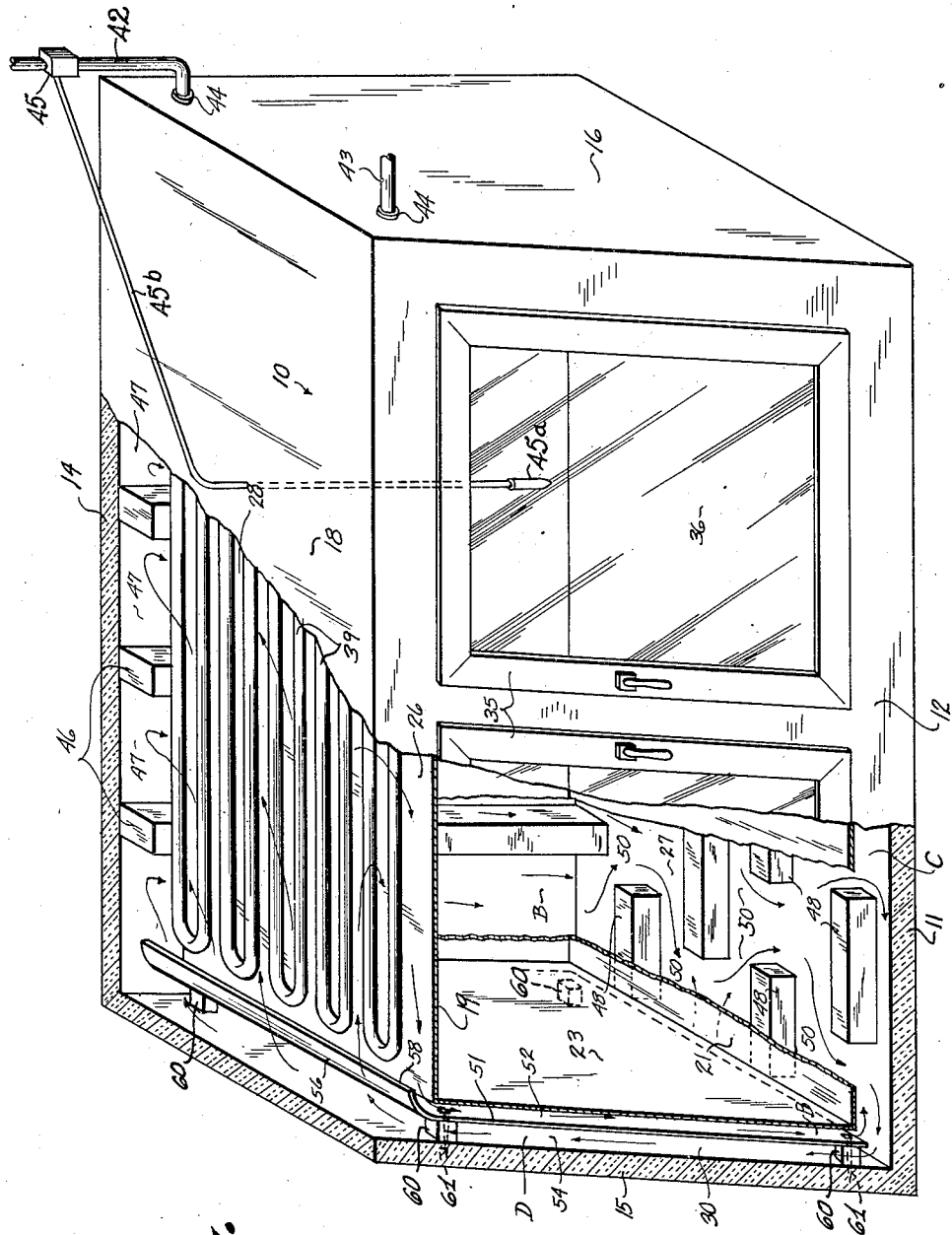

Patented Oct. 10, 1939

2,175,498

UNITED STATES PATENT OFFICE 2,175,498

REFRIGERATOR

Philip S. Wilnau, Sullivan, Mo.

Application May 27, 1937, Serial No. 144,972

10 Claims. (Cl. 62—89.5)

This invention relates to improvements in refrigerators, and more particularly to improved method and means for preserving foods and other perishable articles.

One of the chief difficulties heretofore encountered in the operation of refrigerators of domestic, display case or other types, resides in a partial or substantial reduction in the moisture content normally existing in fresh foods and other articles of a perishable nature, such as vegetables, fruits and the like, after such foods have been stored in the refrigerator even for a relatively short time. In the case of refrigerators of prevailing types, wherein the cooling unit is disposed within the food chamber, it is generally the practice to regulate the unit to provide a freezing temperature at least in the zone of the unit. As a result, the air circulating in the chamber and thermally contacting the unit, generally becomes dry through the freezing-out of the moisture contained in the air. The moisture thus extracted collects on the unit in the form of frost, and the air in turn continually extracts more moisture from the foodstuff. It is well known that a layer of frost on a cooling unit serves as an insulator, which reduces the effectiveness and efficiency of the unit. Moreover, what is more detrimental to the proper preservation of foods, the frost collecting on the unit represents moisture extracted from the air circulating in the food chamber, as well as from the foods stored in the chamber. Consequently, a substantial part of the moisture in the foods may be extracted in a relatively short time, and in certain instances, such loss of moisture may result in the foods becoming so dried and withered as to be unfit for human consumption, or at least unsalable.

Admission of fresh, moisture-containing air to the food chamber, resulting whenever access is had to the chamber for removal or placement therein of foods and other articles, does not remedy the related defects. While the moisture in the fresh incoming air does increase the humidity of the otherwise substantially dry air already in the chamber, it is but a temporary condition, as such moisture soon collects as frost on the cooling unit. The additional collection of frost only serves to augment the inefficiency of the refrigerator.

An attempt to remedy the recited disadvantages of prevailing refrigerators, is found in the so-called "hydrators" which have been incorporated in refrigerator structures. But because the temperature of the air in these hydrators is not controlled, and since it is generally necessary to maintain a body of water therein, the storage of foods in a hydrator does not fully overcome loss of moisture from the foods, because the dry air circulating in the main food chamber also circulates, to some extent, through the hydrator and hence will pick up moisture therein and deposit it on the cooling unit. Accordingly, the principal object of the present invention is to provide an improved refrigerator which will overcome the foregoing objections, and which will provide efficient cooling of the stored articles and at the same time, will substantially maintain the original moisture content of the foods when fresh.

More specifically stated, this object is attained by controlling the cooling of the air circulating in the food storage space and about the food stored therein, in an improved manner, so as to maintain substantially constant, the temperature of such air within the range of a few degrees of a predetermined optimum temperature which is at least a few degrees above the freezing point of the moisture contained by such air. The temperature of the air about the stored foods, maintained at a predetermined desired value, determines the capacity of such air to retain moisture up to the saturation or dew point of the moisture at such temperature, and in the normal operation of the system, the moisture content of such air is maintained substantially at the dew point, whereby to attain a constant humidity of the air in the food space. Thus the temperature and humidity control of the air in contact with the foods stored in the refrigerator, serves to effect an efficient cooling of the foods without removing moisture from the foods. Accordingly, perishable foods and like articles may be preserved in substantially their original fresh state, for periods of 24 hours or more, or if desired, for an indefinite period of time, as there is practically no loss of moisture.

Another object is to provide an improved refrigerator which fully attains the purpose of this invention as stated in the foregoing object, and which is of a type wherein a cooling medium cooled by a refrigerating or heat absorption unit, is utilized to cool the air in the food storage space by indirect thermal contact therewith, and further, wherein both the heat absorption unit and cooling medium are hermetically sealed from the food storage space.

Another object resides in the provision of an improved refrigerator of a preferred form, comprised of a case or cabinet of heat-insulated structure which is preferably hermetically sealed from atmosphere, an inner walled structure or case spaced from the walls of the cabinet to provide a chamber therebetween which is hermetically sealed from the space within the inner case, and a refrigerating element and a cooling medium within the chamber. In addition, partition elements are advantageously disposed in the chamber to form passages which serve to effect a distributed circulation of the cooling medium throughout the chamber, the circulation of the medium being caused by temperature gradients between different zones within the sealed chamber.

A further object is found in the provision of an improved refrigerator of the character described, which is efficient and economical in its function, is comprised of but few parts, and may be produced at a relatively low cost.

Further objects and advantages will appear from the following description and from the drawings, in which:

Fig. 1 is a view in perspective, of a refrigerator incorporating the improved features of this invention, portions of the structure thereof being broken away to illustrate certain features of the refrigerator; Fig. 2 is a longitudinal, vertical section of the refrigerator, and Fig. 3 is a transverse, vertical section thereof, as viewed from line 3—3 in Fig. 2.

Referring to the drawings by suitable characters of reference, the improved refrigerator which is here illustrated as of the display case type, is comprised of a case or cabinet 10 including a base 11, front and rear walls 12 and 14 respectively, end walls 15 and 16 and an upper or top wall 18. The base and walls are of any suitable heat insulating construction, with all joints preferably hermetically sealed from atmosphere. Disposed within the cabinet 10 is a walled structure or inner case 19 defining a space or compartment 20 for the reception of food stuffs and other articles to be kept in a cooled and humid state. The case 19 which is formed of any suitable sheet material having good heat conducting characteristics, such as sheet metal, is comprised of a bottom wall 21, rear wall 22, end walls 23 and 24 and a top wall 26, each of these walls being substantially parallel to but spaced inwardly from the corresponding walls of the cabinet 10. The spacing of the inner case from the walls of the cabinet serves to form a plurality of communicating chambers therebetween, these chambers being horizontal bottom and top chambers 27 and 28 respectively, vertical side chambers 30 and 31 and a vertical rear chamber 32. The forward edges of the top, bottom and end walls of the case 19 are joined in any suitable hermetically sealed manner, to the front wall 12 of cabinet 10. Also, all other joints of the case 19 are preferably hermetically sealed, so that as a result, the chambers between the cabinet 10 and case 19 become hermetically sealed from the food storage space or compartment 20. Moreover, since as heretofore noted, the cabinet structure 10 is, by preference, hermetically sealed, these chambers 27—32 will be sealed from the atmosphere externally of the cabinet.

Access to the compartment 20 is attained through suitable openings 34 in the front wall 12 of cabinet 10, these openings being closed by doors 35, each of which is preferably of glassed construction for display purposes. In the construction of the doors, it is preferred to employ at least two glass panels 36 which are spaced as shown, to provide an air pocket 38 therebetween. The function of the double glass and air pocket arrangement is well known, hence further description thereof need not be given.

Sealed within the chambers 27—32 is a cooling medium, preferably air, which contacts the walls of the inner case 19 for removing heat conducted thereto from the air within the food compartment 20. It is preferred to employ air as the refrigerating medium, since it is light in weight and odorless. Also, air may be freely circulated, and is an efficient cooling agency. The cooling medium has its heat extracted by a suitable heat absorption unit of any desired type, such as the coils 39. The coils 39 are disposed within the upper chamber 28 and overlie substantially the entire surface of the upper wall 26 of case 19. The heat absorption unit is spaced from the upper wall 26 of case 19 and the top wall 18 of cabinet 10 in any suitable manner (not shown). Inlet and outlet connections 42 and 43 respectively, for the coils 39 extend by preference, outwardly through the end wall 16 of the cabinet 10 in the manner shown, these connections being hermetically sealed, as at 44, in their passage through the cabinet wall. The cooling effect of the coils 39 on the cooling medium is regulated in any suitable, well known manner, as by controlling the circulation of refrigerant through the coils, through a control or expansion valve 45 preferably located in the inlet connection 42 which may lead to the delivery side of a compressor unit (not shown) forming a part of any well known refrigerating apparatus. The valve 45 may be of a manually regulated type or as shown, of an automatically regulated type, controlled in any well known manner, as by a thermostat device 45a located in the food chamber 20. In the present example, it is preferred to utilize a syphon type of thermostat connected by a fluid conduit 45b to the valve 45, the conduit being suitably sealed in its passage through the walls of the display case.

Circulation of the cooling medium within the chambers is accomplished through convection currents created by temperature gradients between different zones in the sealed chambers. These convection currents are caused to follow predetermined paths throughout the chambers, by means of channel- or passage-forming elements suitably arranged within the chambers. In the rear chamber 32 are a plurality of vertically extending partition elements 46 which are of a lateral width substantially equal to that of the chamber. These elements are horizontally spaced as shown, to form between each adjacent pair of such elements, vertical passages or channels 47 extending from the top chamber 28 to the bottom chamber 27. Disposed within the bottom chamber 27 are a plurality of partition elements or blocks 48 which are spaced from each other laterally of the chamber, and are arranged in a staggered relation substantially in the manner shown in Fig. 1. The staggered arrangement and spacing of these blocks serves to form tortuous passages denoted generally, by the arrows 50 (Fig. 1). The blocks 48 may serve also, as supporting members for the bottom wall 21 of case 19, while the partition elements 46 may serve as lateral supports for the rear wall 22 of the case 19.

Located within each of the side chambers 30 and 31, is a vertically disposed partition member 51 which is preferably formed of a suitable heat insulating material. Each partition extends laterally between the forward or front wall 12 and the rear wall 14 of cabinet 10, and each divides its respective chamber into two compartments 52 and 54. As shown in Fig. 2, each partition 51 is disposed somewhat nearer the end wall of the case 19 than that of the cabinet 10, so that the volumetric space of compartment 52 is smaller than that of compartment 54, the purpose served by this arrangement being later described. The lower horizontal edge 55 of partition 51 is vertically spaced from the cabinet base 11 to provide a communication between the compartments 52 and 54 and the bottom chamber 27. The upper or top portion 56 of the member 51 is curved inwardly as shown, so that its edge 58 is disposed adjacent the ends of the coils 39 and substantially in the plane of the coils. Each partition 51 is maintained in the above described assembly position within the sealed chamber, by any suitable means such as the spacing blocks 60 and mounting screws 61 (Figs. 1 and 2), a suitable number of such blocks and screws being utilized to assure a positive and substantially rigid placement of the partitions.

The cycle of operation of the cooling medium, which in the present example is air, is substantially as follows. The portion of the air contacting the heat absorption unit 39 becomes cooled thereby, and because its density becomes greater upon cooling, the cooled air tends to settle upon the surface of the upper wall 26 of case 19. But as more of the air comes into heat exchange contact with the unit, the cooled air is displaced over the end and rear edges of the case 19, and thence downwardly in the end or side compartments 52 and rear channels or passages 47, into the bottom chamber 27 where it is caused to follow a circuitous or tortuous path, by reason of the arrangement of the blocks 48. The cooled air circulated as described, thus contacts the top, end, rear and bottom walls of the case 19, and in doing so, absorbs heat from these walls, conducted thereto from the air within the food compartment 20, thereby cooling the food compartment. The air warmed in its thermal contact with the walls of case 19, is displaced by cooler air and tends to flow upwardly in the side compartments 54, whence it contacts the heat absorption unit 39 and is again circulated in the manner described. It is to be noted that by forming the partition elements 51 of a suitable heat insulating or low heat conducting material, the warmed air rising in outside passages 54 is not only heat insulated from the food case 19, but from the cold air flowing downwardly in the inner passages 52, thereby preventing any heating of the cold air by the warm air in passages 54.

The circulation of the air in the sealed chambers is attained as a result of temperature gradients between zones in the chambers. The coolest zone, denoted at A, is that adjacent the refrigerating unit 39 and the surface of the upper wall 26 of the food case 19. As warmer air comes into contact with the unit 39, it displaces the cooled air, so that this air tends to flow over the side and rear edges of the upper wall 26, and thence drop downwardly in the side compartments 52 and rear channels 47. Thus, the downward flow of the cooled air in these passages and the rising of the warmer air in passages 54 create the desired circulation of the cooling medium. Also, in the downward flow of the cooled air, it comes into thermal contact with the end and rear walls of the food case 19, absorbing heat therefrom and hence becoming warmer. As a result the temperature in the lower zones B of the end and rear passages 52 and 47 respectively, is a few degrees warmer than the coolest zone above described. As this air enters the bottom chamber 27 and thermally contacts the bottom wall 21 of the food case, it absorbs more heat from this wall, so that the temperature of the cooling medium in the bottom chamber or zone C, becomes still warmer. By reason of the air entering zone C from the rear channels 47, there exists a temperature gradient from rear to front of this zone, in that the temperature in that part of zone C adjacent the rear wall 14 is slightly lower than that in the part of zone C adjacent the front wall 12. This readily follows, since the air attaining that part of zone C adjacent to wall 12 has absorbed heat from the wall 21 of case 19, while that air entering the rearmost part of zone C has not. The warm air collecting in chamber 27 (zone C) by virtue of its lesser density, travels to and rises in the passages 54, this movement of the air being assisted by the incoming cool, and hence heavier air. The warmed air flowing upwardly in the outer side compartments 54 passes over the curved upper ends 56 of the baffles or partitions 51 to again contact the heat absorption unit 39. It is to be noted that the temperature in the zones D of compartments 54 is higher than in any other zone in the system.

Accordingly, the channels arranged as described, together with the noted temperature gradients between the different zones, serve to induce convection currents which are circulated in a positive and predetermined manner within the sealed chamber. It is to be noted that the temperature variation between the several zones, in the order described, is not more than a few degrees at most, during normal operation of the system. Also, it is to be noted particularly, that the vertical passages formed by the partition elements 46 and 51, and the horizontal, tortuous passages 50 formed by the blocks 48, serve to control and direct the circulation of the cooling air from the refrigerating unit 39 into direct heat exchange contact with the walls of the food compartment or case 19, and thence back to the refrigerating unit through passages 54 which are spaced from the walls of the food compartment, and hence out of thermal contact therewith.

As heretofore described, the volumetric space of compartments 54 is greater than that of compartments 52, this being provided so as not to restrict the free upward flow therein of air which has been warmed in thermal contact with case 19, as this air tends to expand more rapidly than the downward flow of cooled air in the compartment 52. More importantly, however, since the end passages or compartments 54 serve as the return passages for the air flowing downwardly in passages 52 and the several rear passages 47, the combined volumetric capacity of passages 54 must be substantially equal to or greater than the combined capacity of passages 52 and 47. Moreover, the arrangement of the blocks 48 in a spaced and staggered relation serves to distribute the cooled air in the bottom chamber 27 so as to assure thorough thermal contact thereof with substantially the entire surface area of the lower or bottom wall 21 of the cabinet 19, with the exception of the area thereof occupied by the blocks 48.

The refrigerating unit 39 serving to cool the cooling medium, is regulated through control means such as the valve 45 and thermostat 45a forming a part of the refrigerating apparatus, and the circulation and distribution of the cooling medium controlled in the manner heretofore described, so that the cooling effect of the medium is sufficient, under normal operating conditions of the refrigerator, to cool the air within the food compartment 20 to a predetermined desired degree. The temperature to be maintained in the food compartment is determined in each instance by the characteristics of the foods or other perishable articles to be preserved. For example, in the case of vegetables, flowers and other perishable articles of like moisture characteristics, it has been determined by experiment that for best results in preserving these items and maintaining them in the proper humid condition, the temperature in the food compartment 20 should be maintained substantially at a predetermined desired value within the range of about 40 degrees to 45 degrees F. In the instance of dried fruits and smoked meats, the temperature should be maintained at a predetermined value within the range of about 46 to 50 degrees F. For fresh meats and the like, the permissible temperature range is determined to be about 34 to 38 degrees F.

It is to be noted that the temperature of the air in different zones within the food compartment 20 will vary within a few degrees F. of the desired optimum temperature, such variance serving to set up convection currents therein so as to assist the conduction of heat from the foods to the walls of the food case. In all cases, according to the purpose of this invention, the temperature of the air within compartment 20 is always substantially at the dew point of the moisture in such air, and the distribution of the cooling medium over the walls of the food case 19 is such as to attain a temperature variation of not more than a few degrees F. between the coolest and warmest zones in the food compartment.

In order to more clearly point out the improved function of the hereindescribed refrigerator, in preserving foods and perishable articles in a cooled and humid condition, let it be assumed that the refrigerator is regulated in the manner heretofore described, to maintain a temperature of 40 degrees F. within the food space 20. Now then, assume as an example, that the moisture content of the original air in the food space is such that when the air is cooled to 40 degrees, the air becomes saturated with moisture, to the dew point of such moisture at the noted temperature. Accordingly, foods and perishable articles stored in the food space, say in a fresh, moisture-laden condition, will be preserved in a cool and humid state and without loss of moisture, since the air in its moisture saturated condition, cannot pick up or absorb moisture from the foods. Under the same conditions, if foods which have lost some of their original moisture, are placed in the food space, instead of losing any more moisture, such foods will retain whatever quantity of moisture was carried by them prior to placing in the food space. In the last instance, should a door of the refrigerator be opened from time to time for any purpose, warm moisture containing air will be admitted to the food space, and since the air already in the food space is saturated, the additional moisture in the incoming warm air will be absorbed by the moisture-deficient foods stored in the food space. Thus, such moisture-deficient foods may become freshened through addition of moisture thereto. Thereafter, such additional moisture as may be introduced to the food space, will collect on the walls of the food compartment, as well as upon the foods stored therein, in the form of drops of water or dew.

In a further example, assume a non-saturated condition of the air in the food space, when cooled to say 40 degrees F., and that under this circumstance, fresh, moisture-laden foods are placed in the food space. The cooled air may then absorb enough moisture from the foods to raise the moisture content of the air to the dew point. Thereafter, any additional moisture admitted to the food space, either through the admission of warmer, moisture-carrying air to the food space, as when a door is opened, or through the storage of additional moisture-laden foods therein, will be absorbed by moisture-deficient foods which may be stored in the refrigerator.

Thus it will be observed that once a saturated or dew point condition of the air in the food space is attained, fresh, moisture-laden foods placed in the food space will retain such moisture, since the saturated air surrounding the foods cannot absorb any more moisture. This condition, then, may be maintained as long as desired, even to the extent of several weeks or more. It is to be noted in this connection that when the air in the food space is saturated, such additional moisture as may be admitted to the food space will collect in the form of dew, on the walls of the food space and on the food articles. Thereafter, such excess moisture may be absorbed by moisture-deficient foods placed in the food space, so as to raise the moisture content of such foods, and this will occur without in any way disturbing the dew point condition of the air about the foods.

From the foregoing, it will be observed that the controlled function of the improved refrigerator, in preserving perishable articles and foods in a cooled and humid atmosphere, is such as to enable the maintenance of foods and like perishable articles in a remarkably fresh state over relatively long periods, such as several weeks or more. Moreover, the function of the system is such that the fresh, humid state of the foods in the food compartment will not be reduced or adversely altered as a result of relatively frequent opening of the compartment doors 35, as when removing or storing foods therein. As the temperature of the cooling air within the food case 19 is always above the freezing point of moisture carried by the air entering the compartment whenever the doors are opened, such moisture as is contained by the incoming air will be precipitated in the form of dew on the walls, and the food articles, providing the air already in the food space is saturated. If the food space air is not saturated, then the additional moisture will be absorbed by the air, until the dew point is reached.

The presently described improved refrigerator fully attains the foregoing objects and others readily apparent from a full consideration of the invention. Moreover, it is to be understood that the embodiment of the invention here illustrated and described, may be altered or modified in the arrangement of parts without affecting the spirit and full intended scope of the invention, as defined by the appended claims.

I claim:

1. The herein described method of preserving perishable foods and the like, so as to maintain the moisture in such foods, which comprises storing the foods, inducing and directing circulation of a cooling medium from a heat-absorption element into heat exchange relation with said foods, but out of direct contact therewith, and returning said medium to the heat absorption element in a manner to prevent a heat exchange relation of said returning medium with the food.

2. The herein described method of preserving perishable foods and the like, to prevent dehydration of such foods, which consists in storing the foods in a cooled atmosphere, in inducing a circulation of a cooling medium from a heat-absorption element into heat exchange relation with said foods and the atmosphere thereabout, but out of direct contact therewith, and in controlling the circulation and automatically regulating the cooling effect of said medium to maintain the atmosphere about the foods closely within a range approximating the dew point temperature thereof under predetermined conditions of food storage.

3. A refrigerator comprising a hermetically sealed cooling chamber, a food compartment accessible from the exterior but sealed from the cooling chamber, a refrigerating unit in said sealed chamber and overlying said food compartment, said sealed chamber having a cooling medium therein, and a plurality of passages within said chamber arranged for directing the circulation of said medium in a predetermined manner, whereby heat from the food compartment is conveyed to the refrigerating unit.

4. A refrigerator comprising a hermetically sealed cooling chamber, a food compartment in said chamber accessible from the exterior but hermetically sealed from said chamber, a refrigerating unit in said chamber, and said chamber having a cooling medium therein, means in said chamber functionally cooperating with said refrigerating unit for inducing and directing a free circulation of the medium therein, in thermal contact with said food compartment, and means in said chamber, providing a return for said circulated medium to the refrigerating unit, said last means being arranged to prevent heat exchange between the medium traversing said return and said food compartment.

5. A refrigerator comprising a hermetically sealed cooling chamber, a food compartment accessible from the exterior but sealed from said chamber, a refrigerating element in said chamber, said chamber having a cooling medium sealed therein, and passage-forming means in said chamber, arranged for directing the cooling medium into direct thermal contact with the walls of said food compartment, and for returning said medium to said refrigerating unit, but out of thermal contact with the walls of the food compartment.

6. A refrigerator comprising a hermetically sealed cooling chamber, a food compartment accessible from the exterior but sealed from said chamber, a refrigerating unit in said chamber, said chamber having a cooling medium sealed therein, and horizontally and vertically arranged passage-forming elements in said chamber, provided for directing the cooling medium into direct thermal contact with the walls of said food compartment, and for returning the medium to said refrigerating unit, but out of thermal contact with the walls of said compartment.

7. A refrigerator of display type, comprising a food storage compartment, a hermetically sealed chamber substantially surrounding the food compartment, a refrigerating unit in said chamber and overlying said food compartment, said chamber having a cooling medium sealed therein, means in said chamber functionally cooperating with said refrigerating unit for inducing a circulation of said medium from said refrigerating unit into direct heat exchange contact with the walls of said food compartment, and a plurality of passages formed in part by said means, providing a return for said medium to said refrigerating unit, said passages being spaced from said food compartment, whereby to prevent a heat exchange contact of the medium in said passages, with the walls of the food compartment.

8. A refrigerator comprising a hermetically sealed cooling chamber, a food compartment in said chamber accessible from the exterior but hermetically sealed from said chamber, a refrigerating unit in said chamber, in overlying relation to said food compartment, said chamber having a cooling medium therein, elements in said chamber arranged for directing circulation of the medium from said refrigerating unit into thermal contact with the walls of said food compartment, and passages formed by certain of said elements, through which said medium is returned to said refrigerating unit, said passages being spaced from said food compartment.

9. A refrigerator of display case type, comprising a hermetically sealed refrigerating chamber, a food compartment in said chamber, accessible from the exterior but sealed from said chamber, a refrigerating element in said chamber and overlying said compartment, said chamber having a cooling medium sealed therein, and circulation directing means for said medium, arranged in said chamber, said means including elements forming passages for said medium, arranged to direct the medium into direct thermal contact with the walls of said food compartment, and passages for the return of the medium to said refrigerating element, arranged to conduct the medium thereto, without thermal contact with the walls of said compartment.

10. A refrigerator comprising a hermetically sealed cooling chamber, a storage compartment in said chamber accessible from the exterior but hermetically sealed from said chamber, a refrigerating unit in said chamber, said chamber having a cooling medium therein, elements in said chamber arranged for directing circulation of the medium from said refrigerating unit into heat exchange relation with the walls of said storage compartment, and passages formed by certain of said elements, through which said medium is returned to said refrigerating unit, said passages being spaced from said storage compartment, and said passage-forming elements being formed of a material characterized by a low heat conductivity, whereby to prevent heat exchange between the portion of said cooling medium traversing said return passages and the remainder of said medium.

PHILIP S. WILNAU.